(12) United States Patent
Schwager

(10) Patent No.: US 9,681,293 B2
(45) Date of Patent: *Jun. 13, 2017

(54) SYSTEM FOR TRANSMITTING A DATA SIGNAL IN A NETWORK, METHOD, MOBILE TRANSMITTING DEVICE AND NETWORK DEVICE

(71) Applicant: Sony Corporation, Tokyo (JP)

(72) Inventor: Andreas Schwager, Waiblingen (DE)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/488,940

(22) Filed: Sep. 17, 2014

(65) Prior Publication Data

US 2015/0003611 A1    Jan. 1, 2015

Related U.S. Application Data

(63) Continuation of application No. 13/569,529, filed on Aug. 8, 2012, now Pat. No. 8,873,756.

(30) Foreign Application Priority Data

Dec. 12, 2011 (EP) .................................. 11009787

(51) Int. Cl.
*H04L 12/04* (2006.01)
*H04W 12/04* (2009.01)
(Continued)

(52) U.S. Cl.
CPC .............. *H04W 12/04* (2013.01); *H04B 7/00* (2013.01); *H04L 9/00* (2013.01); *H04L 9/0861* (2013.01); *H04L 63/062* (2013.01); *H04L 63/18* (2013.01)

(58) Field of Classification Search
USPC ......................................... 380/270, 328, 338
See application file for complete search history.

(56) References Cited

U.S. PATENT DOCUMENTS 5,887,063 A     3/1999 Varadharajan et al.
2006/0159268 A1  7/2006 Jung et al.
(Continued)

FOREIGN PATENT DOCUMENTS

CN          1612519 A      5/2005
CN         10157446 A     10/2007
(Continued)

OTHER PUBLICATIONS

Extended European Search Report issued Dec. 6, 2012 in European Patent Application No. 12005643.7.
(Continued)

*Primary Examiner* — Jeffrey Pwu
*Assistant Examiner* — Samuel Ambaye
(74) *Attorney, Agent, or Firm* — Oblon, McClelland, Maier & Neustadt, L.L.P.

(57) ABSTRACT

A system for transmitting a data signal is provided, comprising a plurality of network devices; a network connecting the plurality of network devices based on at least a first communication carrier, wherein the first communication carrier is a wired communication carrier; a network key generator configured to generate a network key; a mobile transmitting device configured to transmit the network key to at least one of the plurality of network devices on a second communication carrier, wherein the second communication carrier is a wireless carrier, and wherein the network devices are configured to communicate with the other network devices based on a link encryption key based on the network key. A corresponding method, a mobile transmitting device and a network device are provided as well.

19 Claims, 4 Drawing Sheets

(51) Int. Cl.
*H04L 29/06* (2006.01)
*H04B 7/00* (2006.01)
*H04L 9/00* (2006.01)
*H04L 9/08* (2006.01)

(56) References Cited

U.S. PATENT DOCUMENTS

| | | | |
|---|---|---|---|
| 2007/0106892 A1 | 5/2007 | Engberg | |
| 2007/0192488 A1 | 8/2007 | DaCosta | |
| 2007/0248232 A1 | 10/2007 | Driscoll et al. | |
| 2008/0170540 A1 | 7/2008 | Fukuda | |
| 2008/0222711 A1* | 9/2008 | Michaelis | G07C 9/00039 726/7 |
| 2009/0227282 A1* | 9/2009 | Miyabayashi | H04L 63/0492 455/552.1 |
| 2011/0194624 A1 | 8/2011 | Yakar et al. | |
| 2011/0267956 A1* | 11/2011 | Yonge, III | H04L 12/413 370/241 |
| 2011/0275316 A1 | 11/2011 | Suumäki et al. | |
| 2012/0238206 A1 | 9/2012 | Singh et al. | |

FOREIGN PATENT DOCUMENTS

| | | |
|---|---|---|
| CN | 101778383 A | 7/2010 |
| JP | 2004-64333 A | 2/2004 |
| JP | 2005-535197 A | 11/2005 |
| JP | 2007-532886 | 11/2007 |
| JP | 2008-510185 A | 4/2008 |
| JP | 2011-223544 A | 11/2011 |
| WO | WO 2004/014038 A1 | 2/2004 |
| WO | WO 2006/023334 A2 | 3/2006 |

OTHER PUBLICATIONS

International Search Report and Written Opinion issued Dec. 6, 2012 in PCT/EP2012/004139 filed Oct. 2, 2012.
Japanese Office Action issued Aug. 9, 2016, in Patent Application No. 2014-546337.
Japanese Office Action issued Jan. 10, 2017 in Patent Application No. 2014-546337.
Chinese Office Action issued Mar. 3, 2017 in Chinese Patent Application No. 201280061456.8.
Taiwanese Office Action issued Mar. 30, 2017 in Taiwanese Patent Application No. 10620301660 along with Search Report.

\* cited by examiner

SYSTEM FOR TRANSMITTING A DATA SIGNAL IN A NETWORK, METHOD, MOBILE TRANSMITTING DEVICE AND NETWORK DEVICE

CROSS REFERENCE TO RELATED APPLICATION

This application is a continuation of U.S. application Ser. No. 13/569,529, filed Aug. 8, 2012, which claims the benefit of foreign priority to the earlier filing date of 11 009 787.0 filed in the European Patent Office on Dec. 12, 2011. The entire content of each of the foregoing applications is incorporated by reference herein.

The invention relates to a method for transmitting data in a network, to a corresponding system, to a mobile transmitting device and to a network device.

BACKGROUND

In a home network consumer devices like satellite dishes, door cameras, high definition television sets (HDTV), personal computers (PC) are typically installed fixedly at a location in the home. In order to avoid tapping or data theft it is envisaged to encrypt the network. Therefore, a security network key has to be shared among all devices of the home network.

Today, encrypting of power line communication (PLC) links utilizes PBC (push button configuration). With this method, all PLC modems are equipped with a button (software or hardware). If it is pressed, the modem is prepared to be paired with another modem. If within a given short time limit (for instance two minutes) the button is pressed at a second modem, the second modem will be paired with a first one. If a third modem's button is pressed within the time limit it will also be added to the network, etc. Therefore, usually all modems to be paired are connected to a power strip or to a multiple outlet extension block and the buttons are pressed sequentially within the given time limit. Currently, PLC modems are separate small adapters, easy to disconnect and to carry. However, future home network devices will be established which can no longer easily be connected to a single power strip. To press the button of e.g. a door camera, a satellite dish, several television sets (TV), a digital subscriber line modem (DSL-modem), a personal computer (PC) and home servers etc. in a given short time limit becomes more and more complicated.

It is an object of the invention to provide a method for transmitting data, a system, a mobile transmitting device and a network device for transmitting data that provides a convenient way for the user to create a home network and to add devices to it using encrypted links.

The object is achieved by the subject-matter of the independent claims. Further embodiments are specified in the dependent claims, respectively. Details of the invention will become more apparent from the following description of embodiments in connection with the accompanying drawings, wherein features of the various embodiments may be combined unless they exclude each other.

DETAILED DESCRIPTION

Figure 1:
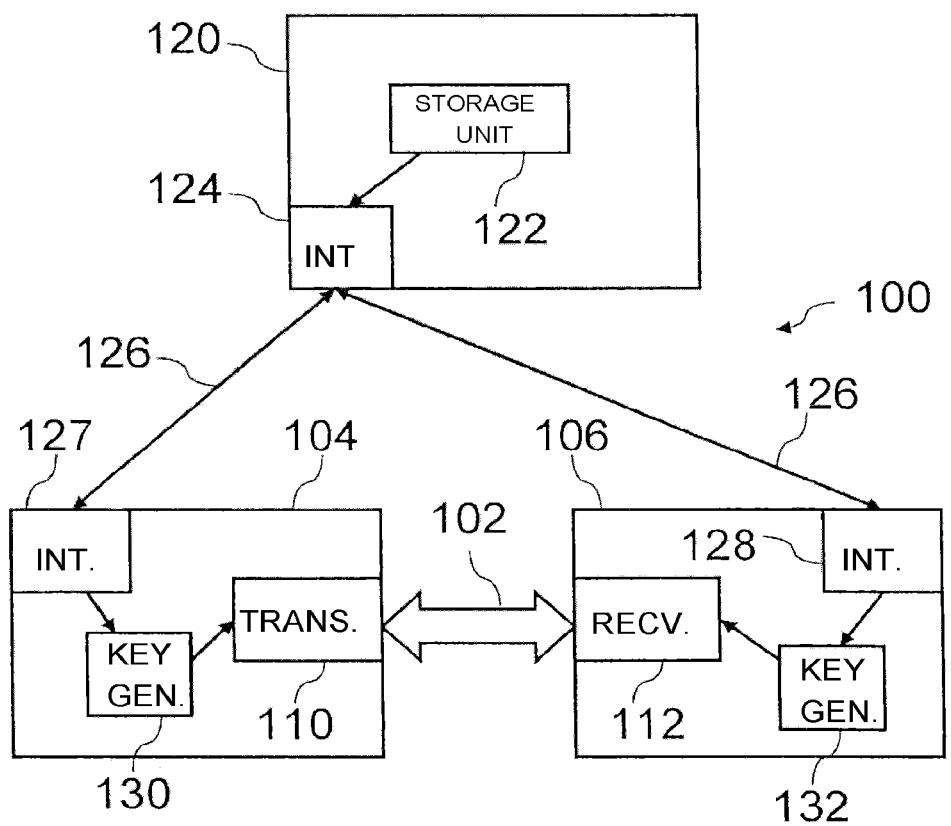
FIG. 1 shows a schematic block diagram of a system according to an embodiment of the invention.

FIG. 1 depicts a system 100 for transmitting a data signal in a network 102 between a first network device 104 and a second network device 106. The wired network 102 is based on a first communication carrier that is a wired communication carrier, for instance a power line communication (PLC) carrier, Ethernet, Coaxial line (e.g. MoCA® (Multimedia over coax alliance), twisted pair line or a digital subscriber line (DSL) carrier. The first network device 104 includes a first transmitter 110 which is connected by the network 102 to a receiver 112 in the second network device 106.

The first network device 104 and the second network device 106 might be realized as e.g. stationary devices that are difficult to move around due to their dimensions or installation locations, as e.g. HDTV sets, satellite dishes on a roof, personal computers PC, home servers etc. Nevertheless the network devices 104, 106 might also be realized as mobile devices that are easier to carry around as e.g. tablet computers, cellular or mobile phones etc.

It is also possible that the network is based on two or more communication carriers, even wireless communication carriers as e.g. Bluetooth® carriers, Zigbee or WiFi carriers.

In accordance with the used communication carriers, the transmitters 104 and receivers 106 include corresponding hardware or software to modulate the data signal on the respective communication carrier or to demodulate it and to use respective communication protocols. The respective different communication carriers might also be referred to as different communication technologies in some embodiments.

Generally, the wired network allows bidirectional communication, so that the first transmitter 110 might also include receiver functionality and the receiver 112 might include transmitter functionality. Thus the transmitter 110 and the receiver 112 might be referred to as "transceivers".

In order to ensure privacy on the wired network 102, a link encryption between the first network device 104 and the second network device 106 might be established.

According to an embodiment of the invention, a mobile transmitting device 120 includes a storage unit 122 for storing a network key that is generated beforehand. It is possible, for instance, that the network key is generated within the mobile transmitting device 120 or by any other, external source, as e.g the first or second network device 104, 106 or a further separate network key generator. The "mobile" transmitting device 120 should be easily portable by a user from one network device 104 to another network device 106. This might be achieved by corresponding outer dimensions and by an accumulator as a power source. The mobile transmitting device 120 might be embodied e.g. as a cellular phone, a smartphone, a tablet computer, a personal digital assistant (PDA), as a notebook computer, or as a remote control (RC).

The mobile transmitting device 120 includes an interface 124, e.g. a further transmitter or transceiver, for transmitting the network key to the first network device 104 and the second network device 106 via a second communication carrier 126, which is different from the first communication carrier 102. The second communication carrier 126 might be implemented e.g. as a near field communication (NFC) carrier or a radio frequency identification (RFID) carrier, or a Bluetooth® carrier.

Near field communication, or NFC, allows for simplified transactions, data exchange, and wireless connections between two devices in proximity to each other, usually by no more than a few centimeters. The Near Field Communication Forum (NFC Forum) formed in 2004 promotes sharing, pairing, and transactions between NFC devices and develops and certifies device compliance with NFC standards. NFC is a set of short-range wireless technologies, typically requiring a distance of 4 cm or less. NFC operates at 13.56 MHz on ISO/IEC 18000-3 air interface and at rates ranging from 106 kbit/s to 424 kbit/s. NFC always involves an initiator and a target; the initiator actively generates an RF field that can power a passive target. This enables NFC targets to take very simple form factors such as tags, stickers, key fobs, or cards that do not require batteries. NFC peer-to-peer communication is possible, provided both devices are powered. There are two modes, a passive communication mode: The initiator device provides a carrier field and the target device answers by modulating the existing field. In this mode, the target device may draw its operating power from the initiator-provided electromagnetic field, thus making the target device a transponder; and an active communication mode: Both initiator and target device communicate by alternately generating their own fields. A device deactivates its RF field while it is waiting for data. In this mode, both devices typically have power supplies.

The interface 124 of the mobile transmitting device 120 communicates via the second communication carrier 126 with corresponding interface 127, 128 (e.g. a further receiver or transceiver) of the first network device 104 and the second network device 106, respectively. The corresponding interfaces 127, 128 transmit the received network key to a respective link encryption generator 130, 132 in the first network device 104 and the second network device 106, respectively.

According to an embodiment, the link encryption key might be equal to the network key, it is however also possible that the link encryption key is adapted to an individual communication carrier that is used on the network 102.

The link encryption generator 130, 132 generates a link encryption key based on the network key forwarded via the interfaces 127, 128 and forwards the link encryption key to the transmitter 110 and the receiver 112. Based on the link encryption key the communication via the network 102 between the first network device 104 and the second network device 106 will take place.

The mobile communication device 120 might also include a transceiver that is connected or connectable to the network 102, so that it might be paired with the other devices and use the link encryption key when communicating on the first communication carrier with the other network devices.

Figure 2:
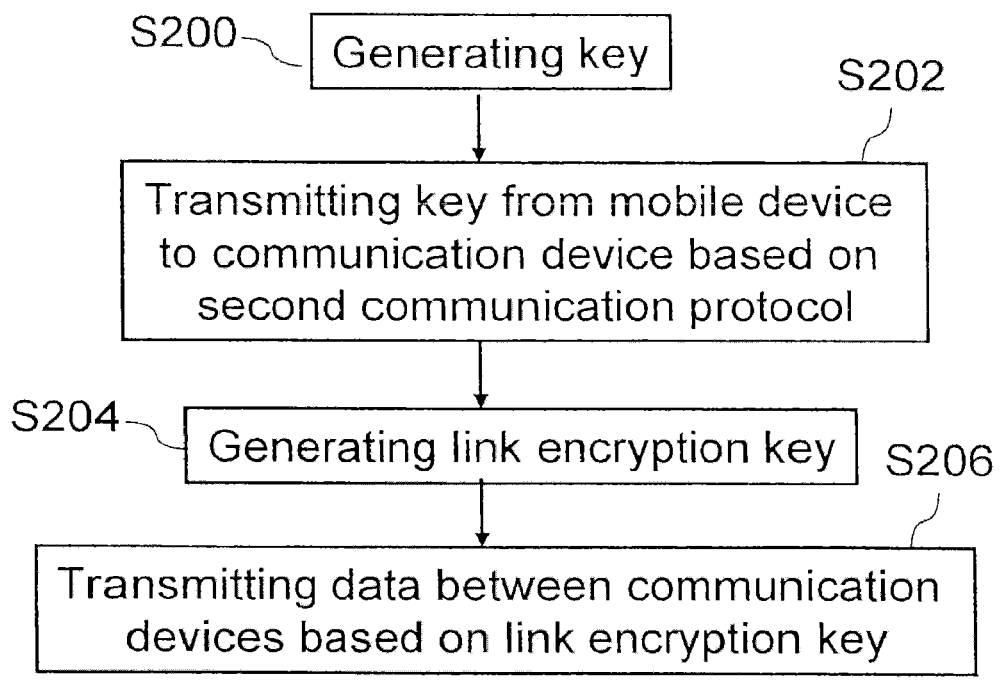
FIG. 2 shows a schematic flow diagram of a method according to an embodiment of the invention.

A corresponding method is schematically depicted in FIG. 2. In step S200 a network key is generated.

In step S202 the network key is transmitted from a mobile transmitting device to at least one of a plurality of network devices based on a second communication carrier.

In a step S204 a link encryption key is generated based on the network key for the first communication carrier.

In a step S206 data is transmitted between network devices in the network based on the link encryption key.

The generation of the network key might also be done in one of the stationary devices and transmitted to the mobile device for exchange to further devices.

Figure 3:
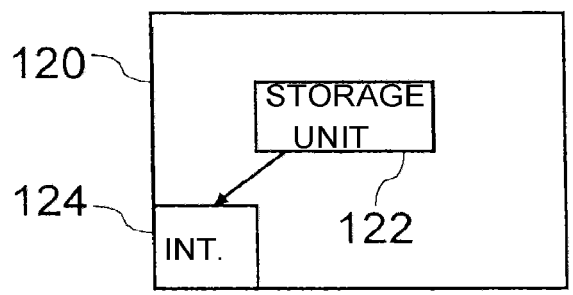
FIG. 3 shows a schematic block diagram of a mobile transmitting device according to an embodiment of the invention.

In FIG. 3 a mobile transmitting device 120 for transmitting a network key used for communicating based on a first communication carrier is schematically depicted. It includes a storage unit 122 for storing a network key and a transmitter 124 configured to transmit the network key based on a second communication carrier to a network device, wherein the second communication carrier is a wireless communication carrier.

Figure 4:
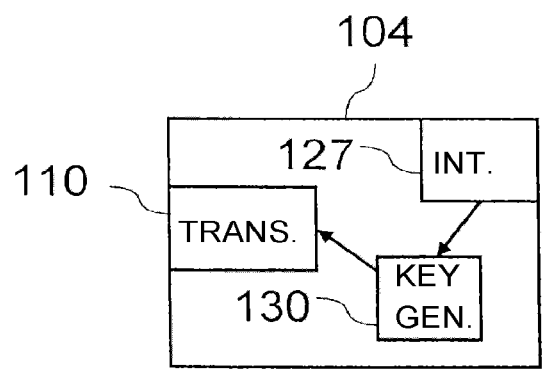
FIG. 4 shows a schematic block diagram of a network device according to an embodiment of the invention.

In FIG. 4 a schematic block diagram of a network device 104 is depicted. It includes a transmitter 110 for transmitting a data signal on a network based on a first communication carrier and a link encryption key, an interface 127 configured to receive a network key based on a second communication carrier, wherein the second communication carrier is a wireless communication carrier, and a link encryption key generator 130 configured to generate the link encryption key based on the network key.

Figure 5:
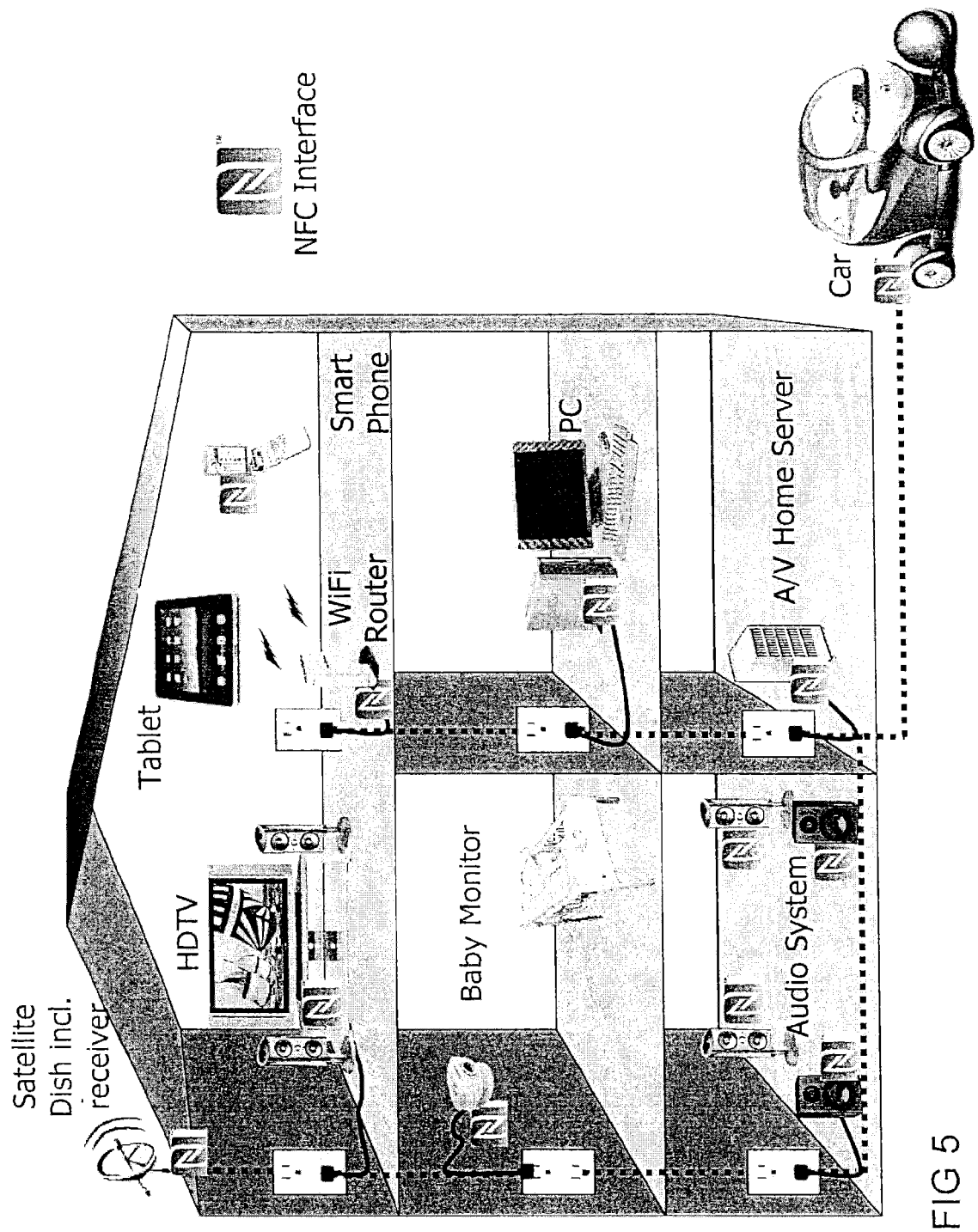
FIG. 5 shows a schematic block diagram of a system according to a further embodiment of the invention.

In FIG. 5 a further embodiment of a system according to an embodiment of the invention is depicted. In the depicted system a plurality of consumer devices like e.g. a satellite dish including a receiver, a high definition television (HDTV), a WiFi router, a baby monitor, a personal computer PC, an audio system, and an audio video home server are connected via a power line network. A smartphone is depicted as a mobile transmitting device which uses a near field communication (NFC) carrier or a radio frequency identification (RFID) carrier for carrying a network encryption network key to the multiple devices in a meshed home network. In the home network multiple devices communicate with each other in the meshed network. Broadcast messages to all devices or multicast messages to some devices are possible.

It is also possible that the multiple devices in the home network communicate over other carriers as e.g. an Ethernet network, over coaxial cables, or other network protocols like e.g. HomePNA (twisted pair cables), WiFi, Bluetooth, ZigBee, etc. Many or all of the devices are equipped with an NFC interface. A portable NFC device like a smartphone, tablet or remote controller RC for a television TV can be used to share an encryption network key among all devices. The portable NFC device might also be referred to as mobile transmitting device.

If two devices equipped within an NFC interface are brought to a very close distance (e.g. 5 cm) an NFC transmission between those devices is activated ("touching"). Hence, the network key can be transmitted to a first device, when the mobile transmitting device is in close contact to the first device, and to a second device of the home network, when the mobile transmitting device is in close contact to the second device. With this method, it is possible that the user carries the mobile transmitting device from one device of the home network to the next device, transmitting the network key to the respective devices one after the other, until all devices of the home network received the network key. It might be possible of course that two devices of the home network can receive the network key at the same time, e.g. if the two devices are located closely together.

When a portable NFC device being able to generate and to carry the encryption network key touches a first stationary networked device a network key might be generated, forwarded to the stationary networked device and stored on the portable NFC device. This stationary device shall use this network key to generate a link encryption key used for communication on the networks that it is connected to. It is, however, possible that the link encryption key is equal to the network key, e.g. if the portable NFC device is able to generate a link encryption key for the communication among the stationary devices of the home network. A device might be connected e.g. to power line communication PLC as well as to a WiFi network. If the portable NFC device touches another network device the network key shall be transferred to this device for future link encryptions on his networks.

If two portable NFC devices touch each other it may be arbitrated who will carry the network key to the other devices. Alternatively both devices can be used for a future device adding to the network.

The portable device might provide a selection possibility to the user if the network key to be used shall be generated new, taken from the stationary device or taken from the network key storage. If the user wishes to setup a new network the initial network key has to be generated. To add further devices to the network this network key has to be stored and used when additional devices are added.

If there is already an encrypted network and a new portable device is added, the network key from the stationary device shall be used for the communications to the new device.

Figure 6:
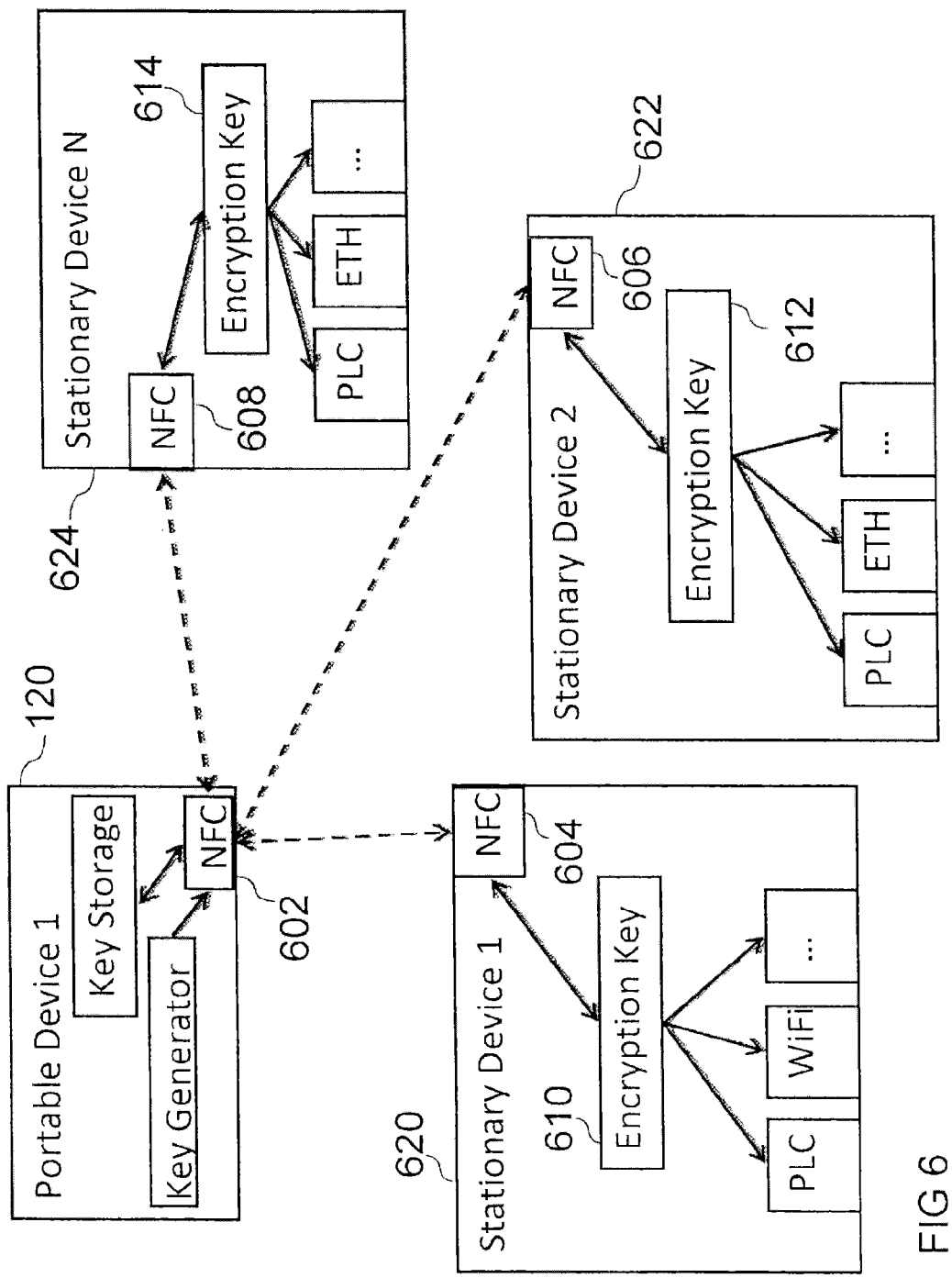
FIG. 6 shows as schematic block diagram of a system according to a further embodiment of the invention.

FIG. 6 shows schematically the further embodiment of a system according to the invention.

As it is depicted in FIG. 6, the mobile or portable transmitting device 120 transmits the network key via the NFC interface 602 to a first stationary device 1 620, a second stationary device 2 622 and a further stationary device N 624, which are equipped with corresponding NFC interfaces 604, 606, 608. Each of the stationary devices includes a link encryption key generator 610, 612, 614, respectively, which generates from the received network key corresponding link encryption keys for their particular communication carriers in accordance with the respective communication protocols that are used by those stationary devices 604, 606, 608. For instance, the stationary device 604 generates respective link encryption keys for power line communication PLC and for WiFi communication. The second stationary device generates link encryption keys for power line communication and for Ethernet (ETH).

Every network might use its network specific link encryption key. This network specific link encryption key is generated based on the network key received via NFC and should be reproducible when a new device is added to the network later.

If not all devices are supported with an NFC interface, a mix of NFC, PPC or UCPK technologies might be used. UCPK (user configured pathway/network key) allows entering a network key to a wizard-type application. In this embodiment the touching of an NFC device is an equivalent action to pressing the button. If the NFC interface is touched and an encryption network key is shared between the NFC enable device, this network key shall be used for future press button control. This node shall send an (PEB) Push-Button_Event notification message. Then, or if within a given time period this device receives a PB_Event notification message, the network type specific PBC protocol is started. The network key initially exchanged should be used for the encryption of the network.

The power line communication (PLC) network might be a multiple-input multiple-output (MIMO) PLC network.

With the embodiments of the invention an encryption network key can be transported in wired home networks to the network devices via an NFC device and it is possible to combine the encryption of multiple networks (multiple physical layers) using NFC.

The invention claimed is:

1. A system for transmitting a data signal, comprising:
   a plurality of network devices, including a first fixed network device and a second fixed network device;
   a network connecting the plurality of network devices based on at least a first communication carrier, the first communication carrier being a wired communication carrier;
   a network key generator configured to generate a network key; and
   a mobile transmitting device, different from the plurality of network devices, configured to transmit the network key to the first fixed network device and the second fixed network device of the plurality of network devices on a second communication carrier, the second communication carrier being a near-field communication carrier,
   wherein the first and second fixed network devices are configured to communicate with each other via the wired communication carrier based on a link encryption key based on the network key, and
   wherein the mobile transmitting device is configured to provide a selection to a user regarding whether the network key is to be generated anew by the mobile transmitting device, received from a third fixed network device of the plurality of network devices, different from the first and second fixed network devices, or retrieved from memory of the mobile transmitting device,
   wherein the network is based on a third communication carrier, the system further comprising:
   a link encryption generator configured to generate a further link encryption key for the third communication carrier based on the network key, and
   wherein the network devices are configured to transmit the data signal between the network devices on the third communication carrier based on the further link encryption key.

2. The system according to claim 1, wherein the first communication carrier is a power line communication (PLC) carrier.

3. The system according to claim 1, wherein said mobile transmitting device is configured to receive the network key from another mobile transmitting device via the near-field communication carrier.

4. The system according to claim 3, wherein, responsive to said mobile transmitting device receiving the network key from said another mobile transmitting device via the near-field communication carrier, said mobile transmitting device and said another transmitting mobile device arbitrate which one of said mobile transmitting devices will retain the network key.

5. The system according to claim 1, wherein said mobile transmitting device is configured to receive the network key from the third fixed network device of the plurality of network devices via the near-field communication carrier.

6. The system according to claim 1, wherein said mobile transmitting device includes the link encryption key and is configured to communicate with the first and second fixed network devices via the wired communication carrier based on the link encryption key.

7. The system according to claim 1, wherein the link encryption key is generated in each of the first and second fixed network devices.

8. The system according to claim 1, wherein the network key generator is in the mobile transmitting device.

9. The system according to claim 1, wherein the network is a meshed home network.

10. The system according to claim 1, wherein the near-field communication carrier has a range of five centimeters or less.

11. The system according to claim 1, wherein the link encryption key is different from the network key.

12. The system according to claim 1, wherein at least one of the first fixed network device and the second fixed network device is a multiple-in multiple-out (MIMO) power line communication (PLC) device.

13. A method for transmitting a data signal in a network including a plurality of network devices, including a first fixed network device and a second fixed network device, based on at least a first communication carrier, the first communication carrier being a wired communication carrier, the method comprising:
  providing a selection, at a mobile transmitting device, which is different from the plurality of network devices, whether a network key is to be generated anew by the mobile transmitting device, received from a third fixed network device of the plurality of network devices, different from the first and second fixed network devices, or retrieved from memory of the mobile transmitting device;
  after said providing the selection, transmitting the network key from the mobile transmitting device to the first fixed network device and the second fixed network device of the plurality of network devices on a second communication carrier, the second communication carrier being a near-field communication carrier; and
  transmitting the data signal between the first and second fixed network devices on the first communication carrier based on a link encryption key that is based on the network key,
  wherein the network is based on a third communication carrier, the method further comprising:
  generating a further link encryption key for the third communication carrier based on the network key; and
  transmitting the data signal between the network devices on the third communication carrier based on the further link encryption key.

14. The method according to claim 13, wherein the first communication carrier is a power line communication carrier, a digital-subscriber-line carrier, a coaxial line carrier, and Ethernet carrier, or a twisted-pair line carrier.

15. The method according to claim 13, wherein said transmitting the network key is performed using circuitry of the mobile transmitting device.

16. A mobile transmitting device for transmitting a network key for communicating between a plurality of network devices, including a first stationary network device and a second stationary network device, using a link encryption key based on the network key, and using a first communication carrier, the first communication carrier being a wired communication carrier, the mobile transmitting device comprising:
  memory to store the network key;
  circuitry configured to select whether the network key is to be generated anew by the mobile transmitting device, received from a third stationary network device of the plurality of network devices, different from the first and second stationary network devices, or retrieved from the memory of the mobile transmitting device; and
  interface circuitry configured to transmit the network key to the first stationary network device and the second stationary network device using a second communication carrier, the second communication carrier being a near-field communication carrier,
  wherein the network key is to provide the link encryption key for communicating between the first stationary network device and the second stationary network device using the first communication carrier, which is the wired communication carrier.

17. A stationary network device for transmitting a data signal on a network based on a first communication carrier and a link encryption key to at least another stationary network device, the first communication carrier being a wired communication carrier, the stationary network device comprising:
  interface circuitry of the stationary network device configured to receive a network key based on a second communication carrier, the second communication carrier being a near-field communication carrier; and
  a link encryption key generator of the stationary network device configured to generate the link encryption key based on the network key,
  wherein the network key is to provide the link encryption key for communicating between the stationary network device and the at least another stationary network device using the first communication carrier, which is the wired communication carrier, and
  wherein the network key is received from a mobile transmitting device based on the second communication carrier, and based on a user selection at the mobile transmitting device regarding whether the network key is to be generated anew by the mobile transmitting device, received from yet another stationary network device, different from the stationary network device and the at least another stationary network device, or retrieved from memory of the mobile transmitting device.

18. A system for transmitting data, comprising:
  a plurality of network devices, including a first immobile network device and a second immobile network device;
  a network connecting the plurality of network devices based on at least two communication carriers, the at least two communication carriers being wireless communication carriers;
  a network key generator configured to generate a network key; and
  a mobile transmitting device, different from the plurality of network devices, configured to transmit the network key to the first immobile network device and the second immobile network device of the plurality of network devices on a further communication carrier, the further communication carrier being a near-field communication carrier,
  wherein the first and second immobile network devices are configured to communicate with each other via the at least two communication carriers based on respective link encryption keys of the first and second network devices based on the network key, and
  wherein the mobile transmitting device is configured to select whether the network key is to be generated anew by the mobile transmitting device, received from a third immobile network device of the plurality of network devices, different from the first and second immobile network devices, or retrieved from memory of the mobile transmitting device, wherein the network is based on a third communication carrier, the system further comprising:

a link encryption generator configured to generate a further link encryption key for the third communication carrier based on the network key, and wherein the network devices are configured to transmit the data signal between the network devices on the third communication carrier based on the further link encryption key.

19. The system according to claim 1, wherein the mobile transmitting device is not communicable with the first and second fixed network devices via the wired communication carrier.

* * * * *